United States Patent [19]

Ambrosiano et al.

[11] 4,398,916
[45] Aug. 16, 1983

[54] PROCESS FOR PURIFICATION OF QUINOLINE YELLOW

[75] Inventors: Nicholas A. Ambrosiano, Cincinnati, Ohio; James E. Kassner, Fort Mitchell, Ky.

[73] Assignee: Sterling Drug Inc., New York, N.Y.

[21] Appl. No.: 315,866

[22] Filed: Oct. 28, 1981

[51] Int. Cl.³ .............................................. C09B 67/00
[52] U.S. Cl. .......................................... 8/602; 8/636; 424/14; 546/173
[58] Field of Search ...................... 8/602, 636; 546/173

[56] References Cited

U.S. PATENT DOCUMENTS

| 290,585 | 12/1883 | Jacobsen | 546/173 |
| 3,470,200 | 9/1969 | Anderson | 106/23 |
| 3,807,949 | 4/1974 | D'Albignac et al. | 8/602 |
| 4,290,812 | 9/1981 | Loock | 106/22 |

OTHER PUBLICATIONS

Kirk-Othmer, "Encyclopedia of Chemical Technology," Third Edition, (1979), vol. 6, p. 577.
Colour Index, (3rd Edition, 1971), The Society of Dyers and Colourists, vol. 4, p. 4435.
K. Venkataraman, "The Chemistry of Synthetic Dyes," vol. VIII, (1978), p. 107.

Primary Examiner—A. Lionel Clingman
Attorney, Agent, or Firm—Lynn T. Fletcher; B. Woodrow Wyatt

[57] ABSTRACT

A multi-step process for the purification of Quinoline Yellow WS involves generating water-insoluble organic amine salts of sulfonated 2-(2-quinolinyl)-1,3-indandione from technical Quinoline Yellow WS followed by treatment of the amine salt with sodium hydroxide to regenerate Quinoline Yellow WS certifiable as a D&C color.

6 Claims, No Drawings

PROCESS FOR PURIFICATION OF QUINOLINE YELLOW

BACKGROUND OF THE INVENTION (a) Field of the Invention

This invention relates to a novel process for the purification of the water-soluble yellow dye which chemically is a mixture in the form of the sodium salts of the products produced by the sulfonation of 2-(2-quinolinyl)-1,3-indandione. Said yellow dye, which is variously known as D and C Yellow 10, Quinoline Yellow WS or Quinoline Yellow, is used as a color additive in drugs and cosmetics. This invention also relates to certain novel organic amine salts of the mixture of sulfonation products obtained from the sulfonation of 2-(2-quinolinyl)-1,3-indandione and their use in the novel process of this invention.

(b) Description of the Prior Art

The prior art appears to be devoid of teachings of organic amine salts of the mixture of sulfonation products obtained from the sulfonation of 2-(2-quinolinyl)-1,3-indandione and/or the use of such salts in a process for the purification of Quinoline Yellow WS. The following items, to date, appear to constitute the most relevant prior art with regard to the instant invention.

Kirk-Othmer "Emcyclopedia of Chemical Technology," Third Edition (1979), John Wiley & Sons, Volume 6, page 577 describes D&C Yellow No. 10 (also known as Quinoline Yellow and Quinoline Yellow WS) as the mixed mono- and disodium salts of the 6-mono- and 6,5'-disulfonic acids of 2-(2-quinolinyl)-1,3-indandione having the Colour Index designation of C.I. Acid Yellow 3 and C.I. No. 47005.

Colour Index (3rd Edition, 1971), The Society of Dyers and Colourists, Volume 4, page 4435 discloses the aluminum salt of C.I. Acid Yellow 3 and assigns the designation Pigment Yellow 115 and C.I. No. 47005:1 to the product.

U.S. Pat. No. 290,585, which issued Dec. 18, 1883 teaches the preparation of Quinoline Yellow by the condensation of "chinaldine" with phthalic anhydride in the presence of a catalytic amount of zinc chloride at 190° to 210° C. and the subsequent sulfonation of the resultant 2-(2-quinolinyl)-1,3-indandione with isolation of the sulfonated product in either the sodium salt or calcium salt form "to render it soluble in water—."

In "The Chemistry of Synthetic Dyes," Vol. VIII, edited by K. Venkataraman, Academic Press (1978), at page 107, it is stated that most commercial Solvent Blue 38 dyes, which are amine salts of sulfonated copper phthalocyanine, are "probably the diarylguanidine salts."

(c) Patent Activities of Others

U.S. Pat. No. 4,290,812, which issued Sept. 22, 1981 teaches a process for the production of an ink free from foreign salts from a water-soluble technical anionic dye in the form of sulfonic acid sodium salts by dissolving the highly water-soluble dye in water, precipitating the dye from the aqueous solution by addition of an organic amine of the cyclohexyl- or dicyclohexylamine type in the form of an acid salt, converting the precipitated dye into a highly water-soluble form by distillation in the presence of water and a water-soluble amine of the alkanolamine type of low volatility, and finally dissolving the water-soluble dye in a solvent to obtain a dye solution.

SUMMARY OF THE INVENTION

The present invention provides a sequential multistep process for the purification of the dyestuff Quinoline Yellow WS which comprises first treating a clarified aqueous solution of technical Quinoline Yellow WS with an organic amine to obtain the amine salts of the dyestuff. The isolated amine salts are then treated with sodium hydroxide in an aqueous system to regenerate the Quinoline Yellow WS in aqueous solution. The liberated amine is removed from the aqueous solution by filtration and/or extraction and the water is evaporated from the aqueous solution to obtain the purified Quinoline Yellow WS having substantially and sufficiently reduced levels of inorganic salts and sulfonated by-products and a sufficiently pure color content to render the dyestuff certifiable as an approved color additive in drugs and cosmetics.

DETAILED DESCRIPTION INCLUSIVE OF THE PREFERRED EMBODIMENTS

In the known method for preparing Quinoline Yellow WS, 2-(2-quinolinyl)-1,3-indandione is sulfonated with fuming sulfuric acid, the sulfonation reaction is drowned in a brine solution and the resultant sodium salts of the mixture of sulfonation products, technical Quinoline Yellow WS, are salted out. The product is then collected by filtration. However, the salting out presents difficulty in that the product is grossly contaminated with both sodium chloride and sodium sulfate and contains other sulfonated by-products such as sulfonated phthalic acid and sulfonated quinaldine. As used throughout this specification and claims, the term "technical Quinoline Yellow WS" refers to this contaminated product obtained directly from the sulfonation and salting-out process. The product thus obtained is unsatisfactory for certification and requires considerable reworking to remove the inorganic salts and to bring the color content to the required level. Such reworking involves copious water washings to remove the inorganic salts. However, it is difficult to wash out the inorganic salts because the product tends to become gelatinous and difficult to filter during the washing process. Hence, it is very difficult and costly to remove the contaminants, particularly the inorganic salts, and to bring the product within the currently required specifications for certification of the dyestuff as a D&C color additive. The instant invention affords an efficient and convenient means of obtaining Quinoline Yellow WS of certifiable quality from technical Quinoline Yellow WS and overcomes the problems heretofore associated with the removal of the aforesaid contaminants and production of the dyestuff product having an acceptable total color content.

More specifically, this invention in one of its aspects, provides a process for the purification of the dye Quinoline Yellow WS wherein the purified dyestuff contains not more than 0.2 percent of sulfonated quinaldines, not more than 0.2 percent of sulfonated phthalic acid, not more than 6.0 percent of chlorides and sulfates as the sodium salts and a total color content of not less than 85 percent which comprises: (a) preparing a clarified aqueous solution at a pH in the range of 7.5 to 8.5 of technical Quinoline Yellow WS; (b) adding to said solution at a temperature in the range of 25° to 70° C. at least a stoichiometric amount of an aqueous solution of an acid addition salt of an organic amine; (c) separating the precipitated amine salts of the dyes; (d) washing said separated amine salts with a lower alkanol or an aqueous solution thereof; (e) dissolving the washed amine salts in sufficient dilute aqueous solution of sodium hydroxide to produce a pH in the range of 11.0 to 12.0 in the solution; (f) separating the liberated amine from said aqueous solution; (g) adjusting the aqueous solution to a pH in the range of 7.0 to 8.5; (h) evaporating the water from the aqueous solution; and (i) optionally washing the residual Quinoline Yellow WS with a lower alkanol.

A particularly preferred process within the ambit of this invention for the purification of the dye Quinoline Yellow WS wherein the purified dyestuff contains not more than 0.2 percent of sulfonated quinaldines, not more than 0.2 percent of sulfonated phthalic acid, not more than 6.0 percent of chlorides and sulfates as the sodium salts and a total color content of not less than 85 percent comprises:

(a) preparing a clarified aqueous solution at a pH in the range of 7.5 to 8.5 of technical Quinoline Yellow WS; (b) adding to said solution at a temperature in the range of 25° to 70° C. at least a stoichiometric amount of an aqueous solution of an acid addition salt of an organic amine chosen from the pair consisting of tertiary octylamine and diphenylquanidine; (c) separating the precipitated amine salts of the dye; (d) washing said separated amine salts with methanol or dilute aqueous ethanol; (e) dissolving the washed amine salts in sufficient dilute aqueous solution of sodium hydroxide to produce a pH in the range of 11.0 to 12.0 in the solution; (f) separating the liberated amine from said aqueous solution followed by extraction of the solution with chlorobenzene; (g) adjusting the pH of the aqueous solution to a pH in the range 7.0 to 8.5; (h) evaporating the water from the aqueous solution; and (i) optionally washing the residual Quinoline Yellow WS with a lower alkanol.

In another of its aspects, this invention provides novel organic amine salts of the mixture of sulfonated products obtained from the sulfonation of 2-(2-quinolinyl)-1,3-indandione. These salts are a necessary and critical element of the process of this invention as they function to temporarily displace the sodium ion in the purification process. Particularly preferred salts are those obtained from the second step of the process of this invention wherein tertiary octylamine is reacted with technical Quinoline Yellow WS. Also preferred are the salts obtained from the second step of the process when diphenylguanidine is reacted with technical Quinoline Yellow WS.

It will be appreciated that technical Quinoline Yellow WS is not a single chemical entity. Rather, it is a mixture of the sodium salts of several mono- and disulfonic acids of 2-(2-quinolinyl)-1,3-indandione. This is because in the known sulfonation of 2-(2-quinolinyl)-1,3-indandione, both the quinolinyl portion and the indandione portion of the compound are susceptible to varying degrees of substitution by sulfonic acid groups. It is generally known from the prior art that the largest single component formed is 2-(6-sulfo-2-quinolinyl)-1,3-indandione (about 64 percent). Next comes the 2-(8-sulfo-2-quinolinyl)-1,3-indandione (about 22 percent), and then lesser amounts of 2-(6,8-disulfo-2-quinolinyl)-1,3-indandione, 2-(6-sulfo-2-quinolinyl)-5-sulfo-1,3-indandione and 2-(8-sulfo-2-quinolinyl)-5-sulfo-1,3-indandione. Hence, throughout this specification it is necessary to refer to the various salts in the plural for each distinct kind of salt.

As used herein the term "technical Quinoline Yellow WS" refers to the mixture of mono- and disodium salts of the sulfonation products of 2-(2-quinolinyl)-1,3-indandione as obtained by the art-known sulfonation process followed by drowning of the reaction mixture in a brine solution. The "technical" product obtained is grossly contaminated with soldium sulfate and sodium chloride as well as with some small amounts of sulfonated phthalic acid and sulfonated guinaldine.

It has been found that the novel purification process of this invention, in addition to removing the various contaminants mentioned above, also advantageously removes substantially all of the disulfonic acids of 2-(2-quinolinyl)-1,3-indandione formed in the conventional sulfonation reaction. The purified Quinoline Yellow WS thus obtained consists almost entirely of the sodium salts of the mixed 2-(8-sulfo-2-quinolinyl)-1,3-indandione and 2-(6-sulfo-2-quinolinyl)-1,3-indandione. This is distinctly advantageous in that the purified Quinoline Yellow WS obtained by the instant process has a cleaner, brighter shade than does Quinoline Yellow WS which is not treated to the subject purification process.

As used herein the term "lower alkanol" means an aliphatic alcohol of one to three carbon atoms and includes methanol, ethyl alcohol, n-propyl alcohol and isopropyl alcohol.

The best mode contemplated by the inventors for carrying out this invention is now described in such terms as to enable any person skilled in the art to which it pertains to make and use the same.

The first step of the process of this invention is carried out by dissolving in a dilute aqueous sodium hydroxide solution the technical Quinoline Yellow WS in the form of a water-wet pulp obtained from the sulfonation and brine quenching of the sulfonated 2-(2-quinolinyl)-1,3-indandione. Solution is facilitated if done at a moderately elevated temperature, for example at approximately 60° to 65° C. After solution is effected, the pH is adjusted to a point in the range of 7.5 to 8.5 by the addition of small amounts of 50 percent aqueous sodium hydroxide, as needed. The alkaline solution is then clarified by treatment with decolorizing carbon and a cellulosic filter aid, preferably at a temperature in the range of 50° to 70° C., and filtration.

In the second step, the clarified alkaline solution of the technical Quinoline Yellow WS is treated with an aqueous solution of an appropriate amine acid addition salt, preferably a hydrochloride. At least a stoichiometric amount of the amine is dissolved in a sufficient volume of a dilute aqueous solution of a mineral acid to form the aqueous solution of the amine salt and the solution thus prepared is added dropwise with agitation during 30 to 60 minutes to the clarified solution of Quinoline Yellow WS at a temperature in the range of 25° to 70° C. The reaction mixture is then stirred for several hours at a temperature in the range of 25° to 60° C. In the third step, the separated amine salts of the mixed monosulfonic acids of 2-(2-quinolinyl)-1,3-indandione are collected by filtration and washed with water until the washes exhibit approximately the same conductance as the water used for the wash. In the fourth step, the collected amine salts are washed with a lower alkanol or an aqueous solution thereof. The solid product can be washed on the filter funnel with the solvent or alternatively, can be slurried in the solvent heated to reflux.

In the fifth step, the washed amine salts are dissolved in sufficient dilute aqueous sodium hydroxide solution to bring the pH to a point in the range of 11.0 to 12.0.

This causes the regenerated free amine to separate while the sodium salts of the product (Quinoline Yellow WS) remain in solution. The sixth step involves the separation of the regenerated free amine. This separation depends to a large extent on the nature of the free amine. If the amine is a filterable solid, such as diphenylguanidine, it is removed by filtration and if it separates as a discrete oil phase, such as tertiary octylamine, it is drawn off from the aqueous layer. However, whatever the mode of separation, the remaining aqueous solution is extracted with a suitable solvent to remove any residual amine which cannot be cleanly separated. Solvents suitable for this purpose are, for example, chlorobenzene, benzene, toluene, xylene and the like. A particularly preferred solvent for this purpose is chlorobenzene.

The seventh step comprises adjusting the pH of the strongly alkaline extracted aqueous solution to a point in the range of 7.0 to 8.5 by the addition of a suitable mineral acid, preferably hydrochloric acid. Then in the eighth step, the aqueous solution is evaporated in vacuo to dryness by any conventional means.

As an optional ninth step, the residual Quinoline Yellow WS is washed with a lower alkanol at the boil and then collected by filtration. Although this final treatment is optional, it has been found that it aids in the final drying of the product to remove any residual unevaporated water and it also enhances uniformity in the texture of the powdery dyestuff by eliminating clumping. Moreover, it serves to further reduce residual amounts, if any, of other contaminants such as the sodium salt of sulfonated phthalic acid and sulfonated quinaldine. Methanol is a particularly preferred solvent for this treatment.

Amines which have been found to be particularly useful in the process of this invention are tertiary octylamine and diphenylguanidine. However, it is contemplated that any aliphatic or aromatic amine or similar basic organic compound, such as a guanidine derivative, which is capable of forming a water-insoluble or sparingly-soluble salt with the sulfonic acids of 2-(2-quinolinyl)-1,3-indandione, would be useful in the practice of the instantly-claimed process. Among such potentially useful salt-forming compounds there may be mentioned without limitation thereto: anilines, haloanilines, substituted diphenylguanidines, and higher alkylamines containing at least six carbon atoms.

The following examples will further illustrate the invention without the latter being limited thereby.

THE STARTING MATERIAL

The starting material, which is generally known in the dyestuffs art as Quinoline Yellow WS (water-soluble), was obtained by art-taught processes for the sulfonation of 2-(2-quinolinyl)-1,3-indandione with a mixture of concentrated sulfuric and fuming sulfuric acids followed by quenching in a brine solution. The Quinoline Yellow WS employed in the following examples was used in the form of the water-wet pulp obtained directly from the sulfonation process. The dyestuff or pure color constituent of the pulp consists of a mixture of the sodium salts of the variously sulfonated 2-(2-quinolinyl)-1,3-indandiones resulting from the sulfonation process. Typically, the pure color component consisted of approximately one percent of the disodium salt of 2-(6,8-disulfo-2-quinolinyl)-1,3-indandione, approximately four percent of the disodium salt of 2-(8-sulfo-2-quinolinyl)-5-sulfo-1,3-indandione, approximately nine percent of the disodium salt of 2-(6-sulfo-2-quinolinyl)-5-sulfo-1,3-indandione, approximately twenty-two percent of the mono-sodium salt of 2-(8-sulfo-2-quinolinyl)-1,3-indandione, and approximately sixty-four percent of the mono-sodium salt of 2-(6-sulfo-2-quinolinyl)-1,3-indandione.

EXAMPLE 1

To a stirred solution of 32.0 ml of 50 percent aqueous solution of sodium hydroxide in two liters of water at 60° to 65° C., there was added 901.6 g of a water-wet pulp of technical Quinoline Yellow WS in which there was 160 g of pure color and 119.6 g of inorganic salts. The pH was at 7.5 to 8.0 during the addition and was adjusted to a final pH 8.0 by adding additional amounts of the caustic as needed. A total of 36.0 ml of the 50 percent aqueous sodium hydroxide solution was used. The resulting solution was clarified by treatment with 11.2 g of decolorizing carbon and 11.2 g of a cellulosic filter aid with stirring at 65° to 70° C. for thirty minutes followed by filtration. The filtered solution of the dye was adjusted to a volume of 3.2 liters. To 2.4 liters of this solution, stirred and heated in the range of 55° to 60° C., there was added dropwise during thirty minutes a solution consisting of 53.5 ml of tertiary octylamine, 300 ml of water and 26.6 ml of concentrated hydrochloric acid. The reaction mixture was stirred and heated at 55° to 60° C. for six hours and then allowed to stand at room temperature for 72 hours. The pH was 6.5 at this point. The separated solid was collected by filtration and washed three times with 250 ml portions of water for each wash. The conductance of the final water wash was 450 micromhos which was approximately the same conductance of the water used for the washes. The resultant tertiary octylamine salts of the mixed monosulfonic acids of 2-(2-quinolinyl)-1,3-indandione were thus obtained in the form of a pulp weighing 242.6 g. A sample of the pulp was assayed for color content from which it was determined the color content was 89.3 g.

A 55.0 g sample of tertiary octylamine salts of the mixed mono-sulfonic acids of 2-(2-quinolinyl)-1,3-indandione obtained as a water-wet pulp comprising approximately 17.0 g of pure color and approximately 33 g of water was slurried in 100 g of 10 percent aqueous ethyl alcohol solution and the slurry heated to reflux. On heating, the slurry thickened and was then diluted with an additional 50 g of 10 percent aqueous ethyl alcohol solution. Heating at reflux was continued for one-half hour after which the slurry was allowed to cool at ambient temperature. The slurry was filtered and the collected product was washed successively with one 25 ml portion of 10 percent aqueous ethyl alcohol solution and three 25 ml portions of water and then dried in vacuo at 60° C. for approximately 72 hours. The tertiary octylamine salts thus obtained consisted of an amorphous bright yellow powder having a melting point greater than 285° C. The nuclear magnetic resonance spectrum was concordant for the assigned structure of the tertiary octylamine salts of the mixed mono-sulfonic acids of 2-(2-quinolinyl)-1,3-indandione. The results of elemental analysis of the product are as follows: (Figures shown are percentages.) Calc'd. for $C_{26}H_{30}N_2O_5S$: C 64.7, H 6.2, N 5.8, S 6.6; Found C 64.21, H 6.26, N 5.73, S 6.79.

The 242.6 g of pulp obtained above in the first part of Example 1 containing 89.3 g of the tertiary octylamine salts of the mixed mono-sulfonic acids of 2-(2-quinolinyl)-1,3-indandione was added to 1.1 liters of warm (35° C.) tap water with stirring. The suspension was then heated to 52° to 54° C. and there was then added dropwise with stirring during 45 minutes 114 ml of ten percent aqueous sodium hydroxide solution. The mixture was stirred at 54° C. for 30 minutes and then filtered to remove the undissolved solid. The solid was washed with 50 ml of water and the wash combined with the filtrated which totaled 1.45 liters. The filtrate was warmed to 40° to 43° C. and extracted successively with 90 ml, and six 30 ml portions of chlorobenzene to remove the regenerated tertiary octylamine after which 1.32 liters of the filtrate was spray-dried in a NIRO Portable Spray Dryer (NIRO ATOMIZER INC., Columbia, MD) at an inlet temmperature of 250° C. and an outlet temperature of 120° C. to obtain 65.3 g of Quinoline Yellow WS (or C.I. Acid Yellow 3) as the sodium salts of predominantly the mixed mono-sulfonic acids having no sulfonated quinaldines, no sulfonated phthalic acid, 4.45 percent of sodium chloride, 0.17 percent of sodium sulfate and a pure color content of 88.4 percent.

EXAMPLE 2

A stirred mixture of 481.5 g of a water-wet pulp of technical Quinoline Yellow WS, in which there was 141.6 g of pure color, and 1.5 liters of distilled water was heated to a temperature in the range of 50° to 55° C. after which 118 g of ten percent aqueous solution of sodium hydroxide was added in a dropwise manner during one hour. The resultant solution was adjusted to pH 7.5 to 8.3 with a small additional amount of ten percent aqueous sodium hydroxide solution. The solution was then heated to a temperature in the range of 70° to 75° C. and there was added 2.7 g of disodium phosphate, 10.0 g of decolorizing carbon and 10.0 g of a cellulosic filter aid. After brief stirring, the heated mixture was filtered through a steam-jacketed filter funnel and the insoluble material remaining on the funnel was washed with 100 ml of distilled water combining the wash with the filtrate. To the thus clarified alkaline solution of the Quinoline Yellow WS there was added a filtered solution prepared by dissolving 87.5 g of diphenylguanidine in a mixture of 33.0 ml concentrated hydrochloric acid and 450 ml water. The pH of the solution was adjusted to 5 to 7 by the addition of ten percent aqueous sodium hydroxide solution and the solution was added dropwise during one hour to the solution of Quinoline Yellow WS held at 55° to 60° C. The reaction mixture was allowed to cool to room temperature and was stirred slowly overnight at ambient temperature. The separated solid was then collected by filtration and was washed successively four times with 400 ml portions of distilled water, once with 600 ml of 20 percent aqueous methanol, and then twice with 200 ml portions of water. The filter cake was then dried at 60° C. in vacuo to obtain 178.5 g of the diphenylguanidine salts of the mixed mono-sulfonic acids of 2-(2-quinolinyl)-1,3-indandione. An analytical sample of the amorphous, bright yellow diphenylguanidine salts prepared in this manner had a melting point of 274.5° to 281.0° C. The results of elemental analysis of a sample of the product are as follows (Figures shown are percentages.) Calc'd. for $C_{31}H_{22}N_4O_5S$: C 66.2, H 3.9, N 10.0, S 5.7; Found C 62.65, H 4.56, N 9.23, S 5.80.

Seventy grams of the diphenylguanidine salts of the mixed mono-sulfonic acids of 2-(2-quinolinyl)-1,3-indandione obtained above was added to 315 ml of distilled water and the stirred slurry was heated to and held at a temperature in the range of 60° to 65° C. for approximately 30 minutes. Then during thirty minutes, 52.3 g of ten percent aqueous sodium hydroxide solution was added to the agitated slurry while maintaining the temperature in the range of 60° to 65° C. Stirring at that temperature was continued for approximately 30 minutes after completion of the addition. The slurry was then filtered to remove the separated diphenylguanidine and the filtrate was extracted three times using 35.0 ml of chlorobenzene for each extraction. The aqueous phase was separated from the chlorobenzene phase and was adjusted to pH 8.0 to 8.5 by the dropwise addition of concentrated hydrochloric acid. The clear aqueous solution was then evaporated to dryness in vacuo at approximately 60° C. The residual solid was further dried in a vacuum oven at 60° C. to a constant weight of 39.6 g.

The solid thus obtained was suspended in 195 ml of methanol and the slurry was heated at reflux for 16 hours and then, after cooling to ambient temperature, was filtered. The solid on the filter was washed two times with a 40 ml portion of methanol for each wash and then dried in vacuo at 60° C. to obtain 38.6 g of Quinoline Yellow WS (or C.I. Acid Yellow 3) as the sodium salts of predominantly the mixed mono-sulfonic acids containing no sulfonated phthalic acid, 0.039 percent of sulfonated quinaldines, 0.6 percent of sodium chloride, 0.03 percent of sodium sulfate and a pure color content of 89.4 percent.

What is claimed is:

1. A process for the purification of the dye Quinoline Yellow WS wherein the purified dyestuff contains not more than 0.2 percent of sulfonated quinaldines, not more than 0.2 percent of sulfonated phthalic acid, not more than 6.0 percent of chlorides and sulfates as the sodium salts and a total color content of not less than 85 percent which comprises:
   (a) preparing a clarified aqueous solution at a pH in the range of 7.5 to 8.5 of technical Quinoline Yellow WS;
   (b) adding to said solution at a temperature in the range of 25° to 70° C. at least a stoichiometric amount of an aqueous solution of an acid addition salt of an organic amine;
   (c) separating the precipitated amine salts of the dyes;
   (d) washing said separated amine salts with a lower alkanol or an aqueous solution thereof;
   (e) dissolving the washed amine salts in sufficient dilute aqueous solution of sodium hydroxide to produce a pH in the range of 11.0 to 12.0 in the solution;
   (f) separating the liberated amine from said aqueous solution;
   (g) adjusting the aqueous solution to a pH in the range of 8.0 to 8.5;
   (h) evaporating the water from the aqueous solution; and
   (i) optionally washing the residual Quinoline Yellow WS with a lower alkanol.

2. A process according to claim 1 for the purification of the dye Quinoline Yellow WS wherein the purified dyestuff contains not more than 0.2 percent of sulfonated quinaldines, not more than 0.2 percent of sulfonated phthalic acid, not more than 6.0 percent of chlorides and sulfates as the sodium salts and a total color content of not less than 85 percent which comprises:

(a) preparing a clarified aqueous solution at a pH in the range of 7.5 to 8.5 of technical Quinoline Yellow WS;
(b) adding to said solution at a temperature in the range of 25° to 70° C. at least a stoichiometric amount of an aqueous solution of an acid addition salt of an organic amine chosen from the pair consisting of tertiary octylamine and diphenylguanidine;
(c) separating the precipitated amine salts of the dye;
(d) washing said separated amine salts with methanol or dilute aqueous ethanol;
(e) dissolving the washed amine salts in sufficient dilute aqueous solution of sodium hydroxide to produce a pH in the range of 11.0 to 12.0 in the solution;
(f) separating the liberated amine from said aqueous solution by filtration of the solution and extraction of the solution with chlorobenzene;
(g) adjusting the aqueous solution to a pH in the range 7.0 to 8.5;
(h) evaporating the water from the aqueous solution; and
(i) optionally washing the residual Quinoline Yellow WS with a lower alkanol.

3. The process according to claim 2 wherein tertiary octylamine hydrochloride is used in Step (b) as the acid addition salt.

4. The process according to claim 2 wherein diphenylguanidine hydrochloride is used in Step (b) as the acid addition salt.

5. The tertiary octylamine salts of the mixture of mono- and disulfonic acids of 2-(2-quinolinyl)-1,3-indanione obtained from the sulfonation of 2-(2-quinolinyl)-1,3-indandione.

6. The diphenylguanidine salts of the mixture of mono- and disulfonic acids of 2-(2-quinolinyl)-1,3-indandione obtained from the sulfonation of 2-(2-quinolinyl)-1,3-indandione.

* * * * *